(12) United States Patent
Alberti et al.

(10) Patent No.: US 9,233,427 B2
(45) Date of Patent: Jan. 12, 2016

(54) PORTABLE BATTERY-POWERED RECIPROCATING SAW

(75) Inventors: Daniel J. Alberti, Brookfield, WI (US); John S. Scott, Brookfield, WI (US); Michael S. Steele, Waukesha, WI (US); Roger D. Neitzell, Palmyra, WI (US); Michael Naughton, Dousman, WI (US); Michael W. Phillips, Milwaukee, WI (US); Andrew Batterman, Butler, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 1758 days.

(21) Appl. No.: 12/399,839

(22) Filed: Mar. 6, 2009

(65) Prior Publication Data

US 2009/0223071 A1 Sep. 10, 2009

Related U.S. Application Data

(60) Provisional application No. 61/034,816, filed on Mar. 7, 2008.

(51) Int. Cl.
| | |
|---|---|
| *B23D 49/16* | (2006.01) |
| *B23D 51/16* | (2006.01) |
| *B25F 5/00* | (2006.01) |
| *B23D 49/11* | (2006.01) |

(52) U.S. Cl.
CPC ............ *B23D 49/162* (2013.01); *B23D 49/11* (2013.01); *B23D 51/16* (2013.01)

(58) Field of Classification Search
CPC ....... B23D 49/162; B23D 49/11; B23D 51/16
USPC ................................................... 30/392–394
See application file for complete search history.

(56) References Cited

U.S. PATENT DOCUMENTS

| | | | | |
|---|---|---|---|---|
| 2,619,132 | A | * | 11/1952 | Pierce .............................. 30/394 |
| 2,866,485 | A |   | 12/1958 | Anton |
| 3,785,053 | A |   | 1/1974 | Michaelson |
| 3,952,239 | A | * | 4/1976 | Owings et al. ................ 320/113 |
| 4,593,466 | A |   | 6/1986 | O'Brien |
| 4,676,001 | A |   | 6/1987 | Wagner |

(Continued)

FOREIGN PATENT DOCUMENTS

| | | |
|---|---|---|
| DE | 3828785 | 4/1989 |
| EP | 0422773 | 4/1991 |

(Continued)

OTHER PUBLICATIONS

GB 1014981.3 United Kingdom Office Action dated Oct. 26, 2011 (4 pages).

(Continued)

*Primary Examiner* — Hwei C Payer
(74) *Attorney, Agent, or Firm* — Michael Best & Friedrich LLP (57) ABSTRACT

A power tool includes a housing having a handle configured for a user, the handle defining a first axis, a motor supported by the housing, the motor defining a second axis along a length of the motor, a tool element movably supported by the housing and drivingly coupled to the motor, the tool element defining a third axis along a length of the tool element. Each of the first, second, and third axes are oblique with respect to each of the other axes.

19 Claims, 8 Drawing Sheets

(56) References Cited

U.S. PATENT DOCUMENTS

| | | | |
|---|---|---|---|
| 5,069,695 A * | 12/1991 | Austin | 55/385.1 |
| 5,134,777 A | 8/1992 | Meyer et al. | |
| 5,193,281 A | 3/1993 | Kasten | |
| 5,212,887 A | 5/1993 | Farmerie | |
| 5,265,340 A * | 11/1993 | Nitz et al. | 30/166.3 |
| 5,287,786 A * | 2/1994 | Fiala | 83/863 |
| 5,466,183 A | 11/1995 | Kirn et al. | |
| 5,681,214 A | 10/1997 | Kleider et al. | |
| 5,755,293 A | 5/1998 | Bourke | |
| 5,832,611 A * | 11/1998 | Schmitz | 30/392 |
| 5,897,570 A * | 4/1999 | Palleva et al. | 606/171 |
| 5,940,977 A | 8/1999 | Moores, Jr. | |
| 5,964,039 A | 10/1999 | Mizoguchi et al. | |
| 6,021,573 A | 2/2000 | Kikuchi et al. | |
| 6,138,346 A | 10/2000 | Shutts et al. | |
| D436,011 S | 1/2001 | Fuchs et al. | |
| D447,924 S | 9/2001 | Neitzell et al. | |
| 6,286,611 B1 | 9/2001 | Bone | |
| 6,293,859 B1 | 9/2001 | Fink et al. | |
| D455,328 S | 4/2002 | Bruno | |
| D475,907 S | 6/2003 | Neitzell et al. | |
| 6,671,969 B2 | 1/2004 | Phillips et al. | |
| D487,384 S | 3/2004 | Neitzell et al. | |
| 6,725,548 B1 | 4/2004 | Kramer et al. | |
| 6,742,266 B2 | 6/2004 | Splane, Jr. | |
| 6,912,790 B2 | 7/2005 | James et al. | |
| 6,920,814 B2 | 7/2005 | Gass et al. | |
| 7,096,589 B2 | 8/2006 | Phillips et al. | |
| 7,204,026 B2 | 4/2007 | Phillips et al. | |
| 7,216,433 B2 * | 5/2007 | Haas et al. | 30/393 |
| 7,506,447 B2 * | 3/2009 | Wheeler et al. | 30/392 |
| 7,818,887 B2 * | 10/2010 | Saegesser et al. | 30/392 |
| 7,913,403 B1 * | 3/2011 | Willetts | 30/392 |
| 2003/0145472 A1 | 8/2003 | Swift | |
| 2004/0068876 A1 | 4/2004 | Bigden et al. | |
| 2004/0117993 A1 | 6/2004 | Armstrong | |
| 2004/0231170 A1 | 11/2004 | Neitzell et al. | |
| 2004/0237678 A1 | 12/2004 | Lagaly et al. | |
| 2004/0261273 A1 | 12/2004 | Griep et al. | |
| 2006/0005402 A1 | 1/2006 | Nottingham et al. | |
| 2006/0220612 A1 | 10/2006 | Feldmann et al. | |
| 2006/0260141 A1 | 11/2006 | Phillips et al. | |
| 2007/0017684 A1 | 1/2007 | Stirm et al. | |
| 2007/0074407 A1 | 4/2007 | Serdynski et al. | |
| 2007/0144310 A1 | 6/2007 | Pozgay et al. | |
| 2007/0144752 A1 | 6/2007 | Pozgay et al. | |
| 2008/0010840 A1 | 1/2008 | Lagaly et al. | |
| 2008/0047150 A1 | 2/2008 | Phillips et al. | |
| 2008/0229591 A1 | 9/2008 | Saegesser | |
| 2010/0162579 A1 * | 7/2010 | Naughton et al. | 30/392 |
| 2010/0275452 A1 | 11/2010 | Saegesser et al. | |
| 2012/0192438 A1 | 8/2012 | Aoki et al. | |

FOREIGN PATENT DOCUMENTS

| | | |
|---|---|---|
| EP | 0768138 | 4/1997 |
| EP | 1203628 | 5/2002 |
| EP | 1325790 | 7/2003 |
| EP | 1582313 | 10/2005 |
| EP | 2239078 | 10/2010 |
| GB | 2234034 | 1/1991 |
| JP | 382117 | 8/1991 |
| JP | 6155402 | 6/1994 |
| JP | 06198601 | 7/1994 |
| JP | 2004130801 | 4/2004 |
| JP | 2005118952 | 5/2005 |
| WO | 2008003543 | 1/2008 |
| WO | 2009111747 | 9/2009 |

OTHER PUBLICATIONS

Bosch "Bosch Power Tools for DIY and Garden" dated 1997 (4 pages).
Makita "9.6 Volt Cordless Power Tools" dated 1993 (2 pages).
PCT/US09/36403 International Search Report and Written Opinion, 13 pages, Dated May 4, 2009.
Exploded view of Black and Decker VP650 Saw, available prior to Jul. 7, 2008.
Milwaukee Electric Tool Corporation, "Compact Cordless Sawzall—The Hatchet", Press Release Archive, Sep. 11, 2001.
Bosch Sabre Plus, In-Line Grip Jigsaw 3294EVS, webpage accessed Jul. 30, 2000.
Kress Operating Instructions for APS 132, at least as early as Apr. 26, 2007.
Makita, Cordless Recipro Saw Instruction Manual for Model 4390D and Model 4390W with Fast Charger, Feb. 19, 1991.
Milwaukee Electric Tool, Operator's Manual, Catalog No. 6538-1, 6539-1, 6540-1, 6546-1, 6547-1, Heavy Duty Cordless Screwdrivers, available at least as early as Apr. 26, 2007.
Black & Decker, Product Guide, Product Details, Product Facts, Pivot Driver>Model VP750, 3.6 Volt Cordless VersaPak 2 Position Pivot Driver Screwdriver, Nov. 16, 2001.
Porter Cable Instruction Manual, Double Insulated Variable Speed Tiger Cub All Purpose Saw Model 647, available at least as early as Apr. 26, 2007.
Black & Decker Product Description, 7.2 Volt VersaPak Cordless Multi-Purpose Saw VP650, webpage accessed Aug. 1, 2000.
Black & Decker Instruction Manual for VersaPak, 7.2 Volt Cordless Multi-Purpose Saw VP650, available at least as early as Apr. 26, 2007.
Milwaukee Electric Tool Corporation, Heavy-Duty Club Tool-Gram, Special Sawzall Issue, "Sawzall—The Hatchet Built for Tight Spaces", Mar. 2001.
Search Report from the United Kingdom Intellectual Property Office for Application No. 1212842.7 dated Aug. 7, 2012 (6 pages).
Search Report from the United Kingdom Intellectual Property Office for Application No. 1212841.9 dated Aug. 7, 2012 (5 pages).
Extended European Search Report from the European Patent Office for Application No. 09717482.5 dated Apr. 20, 2012 (6 pages).

* cited by examiner

PORTABLE BATTERY-POWERED RECIPROCATING SAW

CROSS REFERENCE TO RELATED APPLICATIONS

The present patent application claims priority to U.S. Provisional Patent Application Ser. No. 61/034,816, titled "PORTABLE BATTERY-POWERED RECIPROCATING SAW" and filed on Mar. 7, 2008 by Daniel J. Alberti, John S. Scott, Michael S. Steele, Roger D. Neitzell, and Michael Naughton, the entire contents of which is hereby incorporated by reference.

BACKGROUND

The present invention relates to a reciprocating saw, and, more particularly, to a portable, battery powered reciprocating saw.

Reciprocating saws are used to cut a variety of objects made from a variety of materials, such as metal pipes, wood and dry wall. A cordless, compact reciprocating saw allows for cutting operations in tight spaces or awkward angles for plumbing, electrical, remodeling and HVAC applications.

SUMMARY

In one embodiment, the invention provides a power tool. The power tool includes a housing having a handle configured for a user, the handle defining a first axis. A motor supported by the housing, the motor defining a second axis along a length of the motor. A tool element movably supported by the housing and drivingly coupled to the motor, the tool element defining a third axis along a length of the tool element. Each of the first, second, and third axes are oblique with respect to each of the other axes.

In another embodiment, the invention provides a reciprocating saw. The reciprocating saw includes a housing having a handle configured for a user to grasp, the handle defining a first axis. A motor supported by the housing, the motor defining a second axis along a length of the motor. A spindle movably supported by the housing and drivingly coupled to the motor, the spindle having an end adapted to support a saw blade and defining a third axis along a length of the spindle. Each of the first, second, and third axes are non-parallel with respect to each of the other axes.

In yet another embodiment, the invention provides a reciprocating saw. The reciprocating saw includes a housing having a battery cavity adapted to receive a battery, the housing defining a first axis along which the battery is received in the housing. A motor supported by the housing, the motor defining a second axis along a length of the motor. A spindle movably supported by the housing and drivingly coupled to the motor, the spindle having an end adapted to support a saw blade and defining a third axis along a length of the spindle. The first axis is at a first angle with respect to the second axis and the second axis is at a second angle with respect to the third axis.

In yet another embodiment, the invention provides a power tool. The power tool includes a housing including a boss and a battery cavity adapted to receive a battery, a motor supported by the housing, a tool element drivingly coupled to the motor, a drive system operable to drive the tool element, a gear case substantially enclosing the drive system, wherein the gear case includes a tab having an aperture for receiving the boss of the housing, and a fastener extending through the boss to couple the gear case to the housing. The boss electrically isolates the gear case from the fastener.

In yet another embodiment, the invention provides a power tool. The power tool includes a housing including a handle portion, the housing formed from a first housing portion and a second housing portion, each housing portion including a boss, wherein the boss of the first housing portion substantially aligns with the boss on the second housing portion. The power tool further includes a motor supported by the housing, a tool element drivingly coupled to the motor, a drive system coupling the motor to the tool element, the drive system operable to drive the tool element, a gear case substantially enclosing the drive system, the gear case including a tab with an aperture, wherein the aperture of the tab receives at least one of the bosses, and a fastener extends through the bosses to couple the gear case to the housing. The bosses electrically isolate the gear case from the fastener.

In yet another embodiment, the invention provides a reciprocating saw. The reciprocating saw includes a housing including a handle portion, the housing formed from a first housing portion and a second housing portion, each housing portion including a boss, wherein the boss of the first housing portion substantially aligns with the boss on the second housing portion. The reciprocating saw further includes a motor supported by the housing, a spindle movably supported by the housing and drivingly coupled to the motor, the spindle having an end adapted to support a saw blade, a drive system coupling the motor to the spindle, the drive system operable to drive the spindle, a gear case substantially enclosing the drive system, the gear case including a tab with an aperture, wherein the aperture of the tab receives at least one of the bosses, and a fastener extends through the bosses to couple the gear case to the housing. The bosses electrically isolate the gear case from the fastener.

Other aspects of the invention will become apparent by consideration of the detailed description and accompanying drawings.

BRIEF DESCRIPTION OF THE DRAWINGS

FIG. 2 is another perspective view of the portable reciprocating saw shown in FIG. 1a.

FIG. 3 is a side view of the portable reciprocating saw shown in FIG. 1a.

FIG. 4 is another side view of the portable reciprocating saw shown in FIG. 1a.

FIG. 5 is a front view of the portable reciprocating saw shown in FIG. 1a.

FIG. 6 is a rear view of the portable reciprocating saw shown in FIG. 1a.

FIG. 7 is a cross section view of the portable reciprocating saw shown in FIG. 1a.

FIG. 8 is an exploded view of the portable reciprocating saw shown in FIG. 1a.

FIG. 9 is a detailed view of a portion of the gear case and housing of the portable reciprocating saw shown in FIG. 1a.

Before at least one embodiment of the invention is explained in detail, it is to be understood that the invention is not limited it its application to the details of the construction and the arrangements of the components set forth in the following description or illustrated in the drawings. The invention is capable of other embodiments and of being practices or carried out in various ways. In addition, it is understood that the phraseology and terminology used herein is for the purpose of description and should not be regarded as limiting.

DETAILED DESCRIPTION

A portable hand tool 20 or a portable reciprocating saw is shown in FIGS. 1-9. In these constructions, the saw 20 is a battery-powered reciprocating saw. In the illustrated constructions, the saw 20 is powered by a power tool battery pack 25. The battery pack 25 may be configured to connect and power a variety of tools in addition to the reciprocating saw 20. In the construction shown, the battery pack 25 is a 12V lithium-ion battery pack. The pack 25 includes three (3) battery cells (not shown) connected in series. In other embodiments, the battery pack 25 may include fewer or more battery cells, such that the battery pack 25 is a 14.4-volt power tool battery pack, an 18-volt power tool battery pack, or the like. Additionally or alternatively, the battery cells may have chemistries other than lithium-ion such as, for example, nickel cadmium, nickel metal-hydride, or the like. In still other constructions, the saw 20 may be a corded power tool. In other embodiments, the power tool may be another handheld power tool, such as, for example, another type of reciprocating power tool, a drill, a screwdriver, or other handheld power tool.

Figure 8:
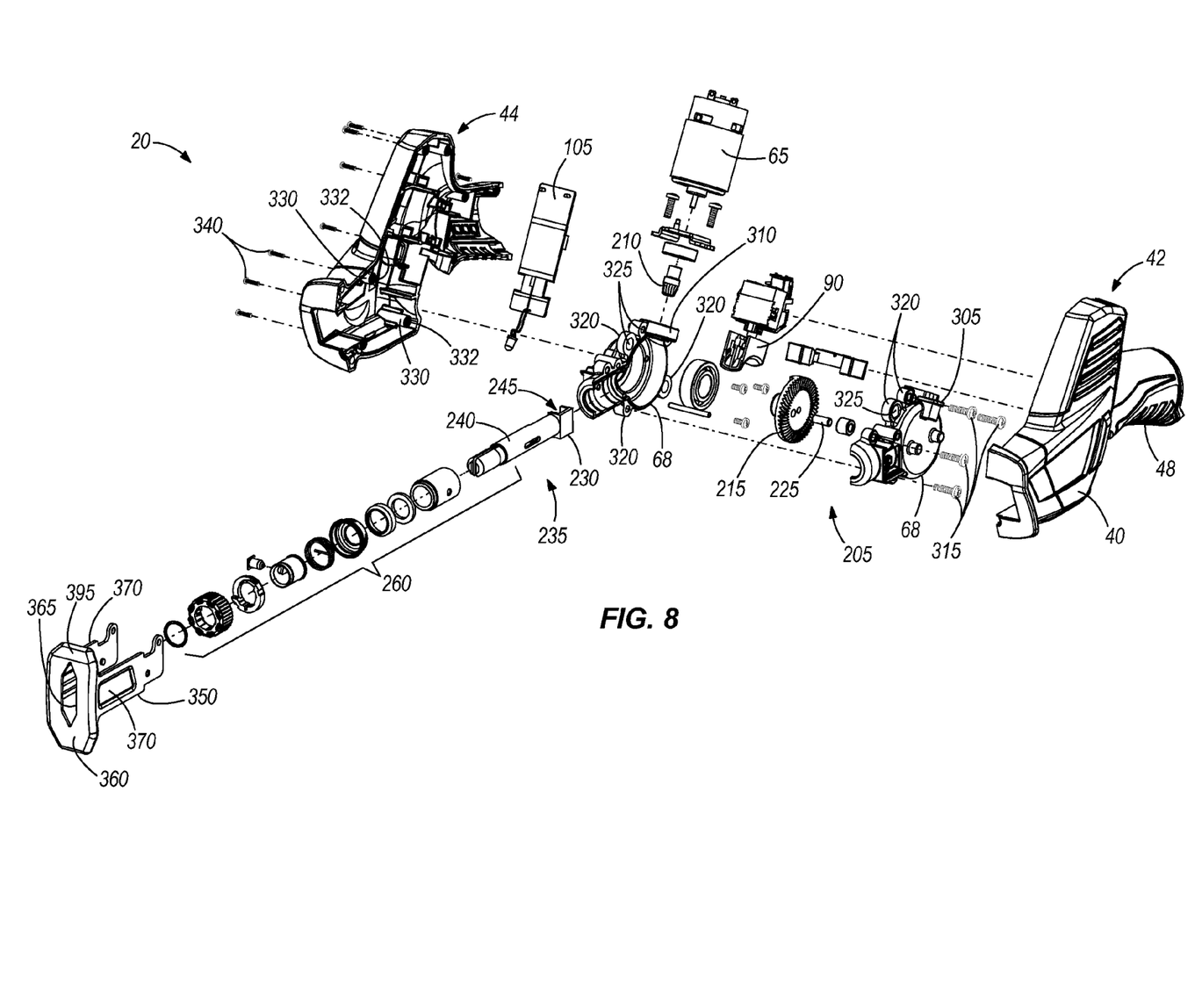

The saw 20 includes a housing 40. As shown in FIG. 8, the housing 40 has a first housing portion 42 and a second housing portion 44. Each housing portion 42, 44 is formed of plastic; however, in some embodiments, the housing portions 42, 44 may be formed of other materials. In the construction shown, bosses 330 are formed in both housing portions 42, 44. Each boss 330 includes an aperture 332, and each aperture 332 extends through each housing portion 42, 44. When the housing portions 42, 44 are assembled, the apertures 332 from the first housing portion 42 generally align with the apertures 332 from the second housing portion 44. In some constructions, the bosses 330 from the first housing portion 42 align with and are in physical contact with the bosses 330 formed in the second housing portion 44. In other constructions, the bosses 330 may be adjacent to respective bosses 330, although not in physical contact with each other. In some constructions, the bosses 330 may be of the same height. In other constructions, the bosses 330 may be of different height, such that to engage with each other, bosses 330 on one of the housing portions 42, 44 extend further than the bosses 330 on the other of the housing portions 42, 44 (e.g., beyond an interface line between the housing portions 42, 44).

Figure 7:
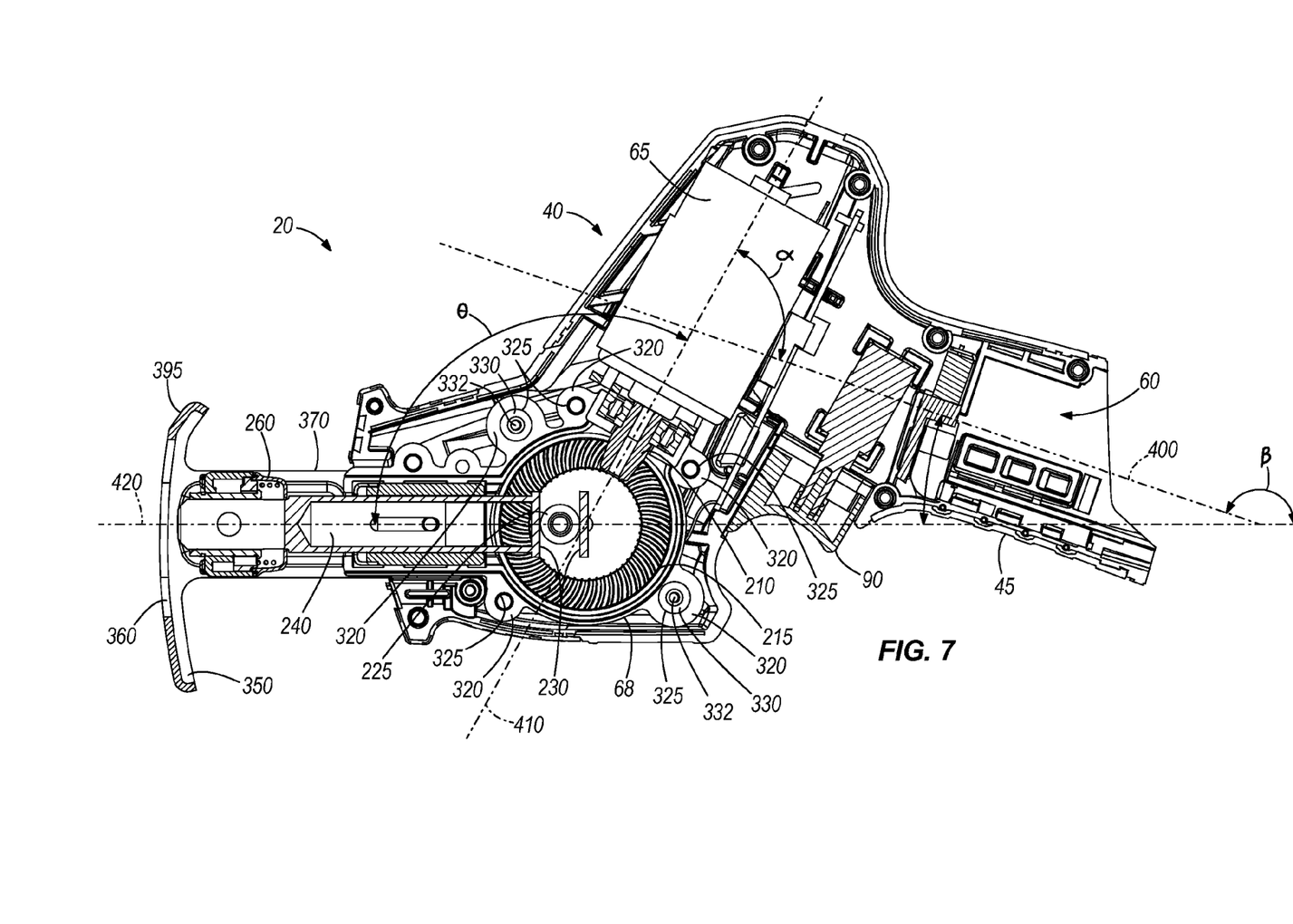

The housing 40 defines a handle housing portion 45, a motor housing portion 50 and a gear case housing portion 55. The handle housing portion 45 includes at least one grip surface 48 for a user to grasp. In the illustrated constructions, the handle housing portion 45 can also define a battery receiving portion 60 (FIGS. 2 and 6) for receiving the battery pack 25. In other constructions, the battery receiving portion 60 may be defined elsewhere within the housing 40. The motor housing portion 50 supports a motor 65 (FIGS. 7 and 8), and the gear case housing portion 55 in turn supports a gear case 68 (FIGS. 7 and 8).

Figure 1:
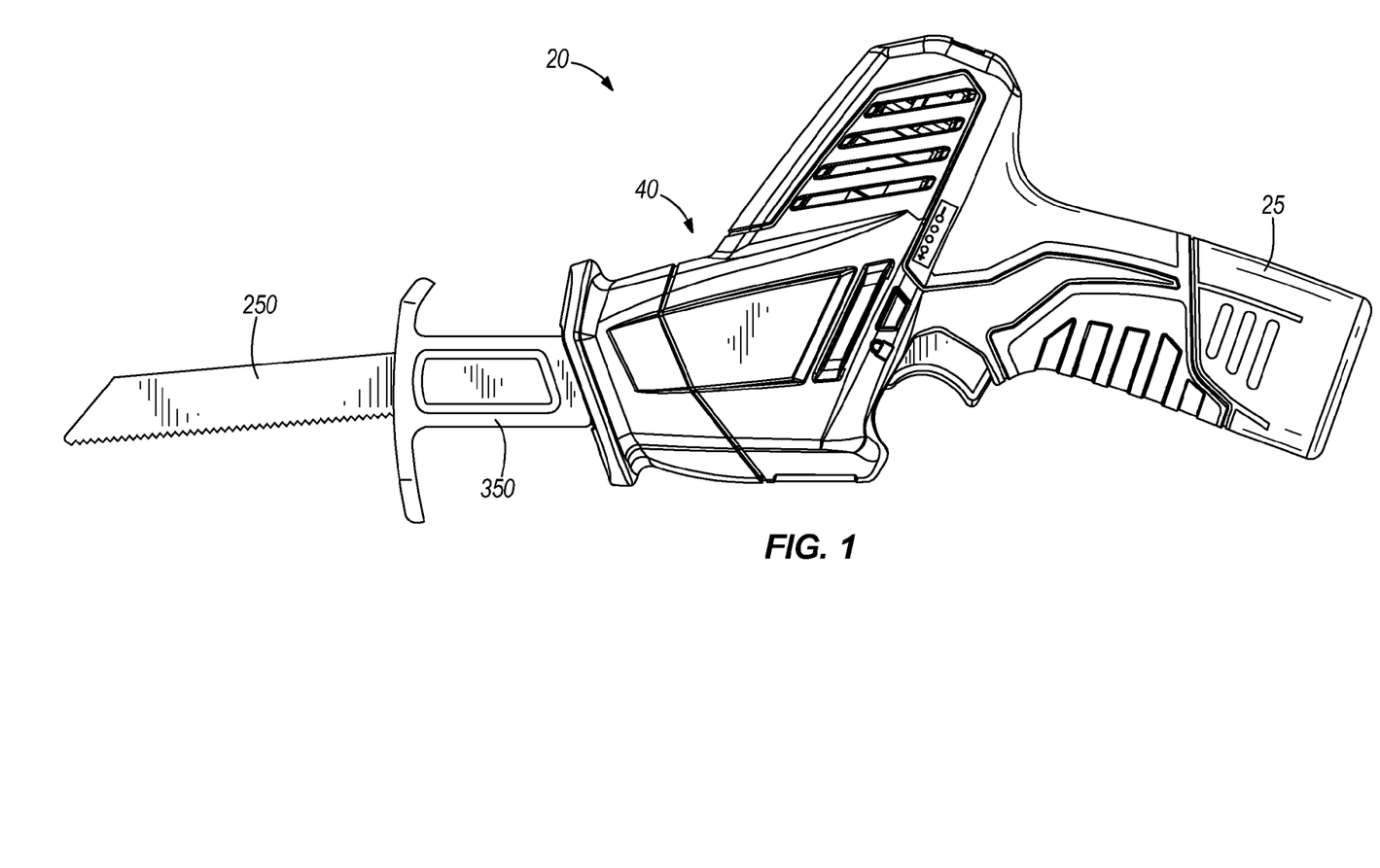
FIG. 1 is a side view of a portable battery-powered reciprocating saw according to an embodiment of the invention.
Figure 1A:
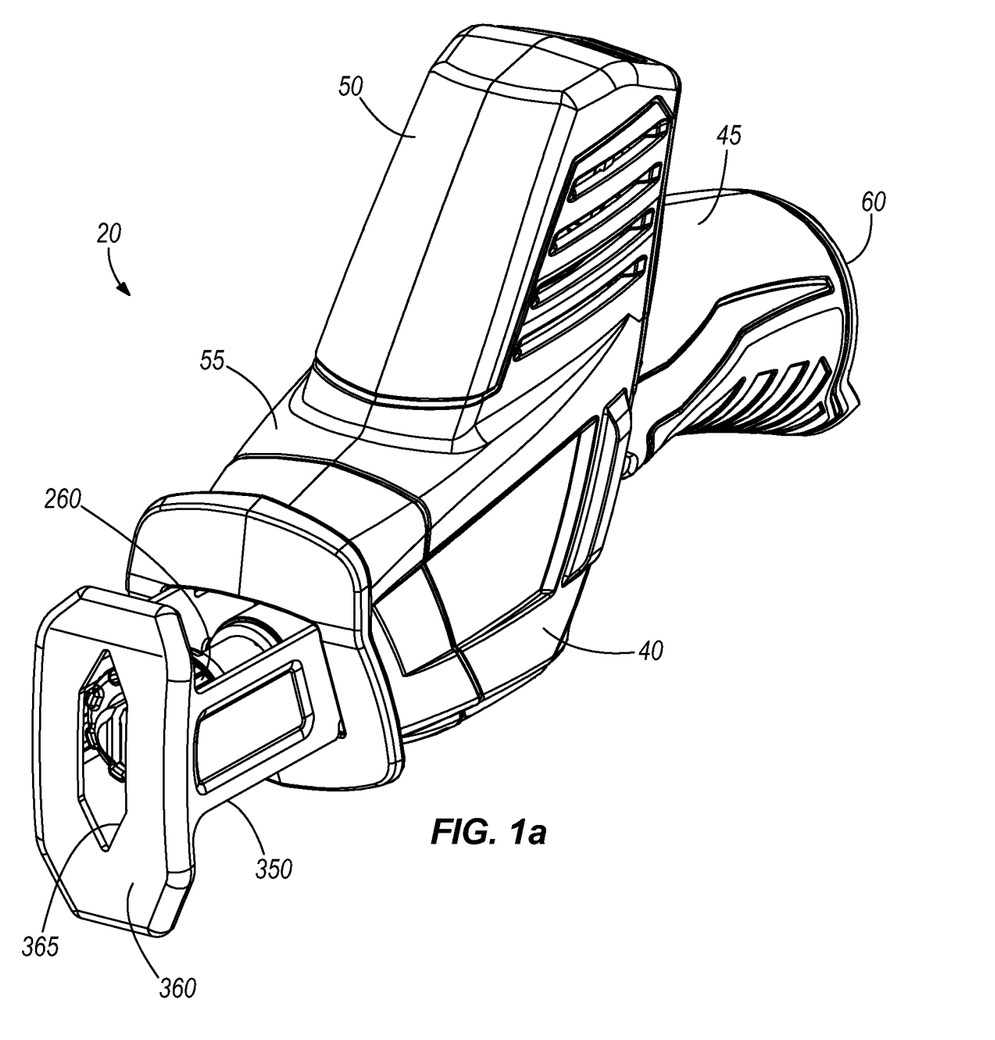
FIG. 1a is a perspective view of the portable battery-powered reciprocating saw shown in FIG. 1 with a blade and battery pack removed.
Figure 2:
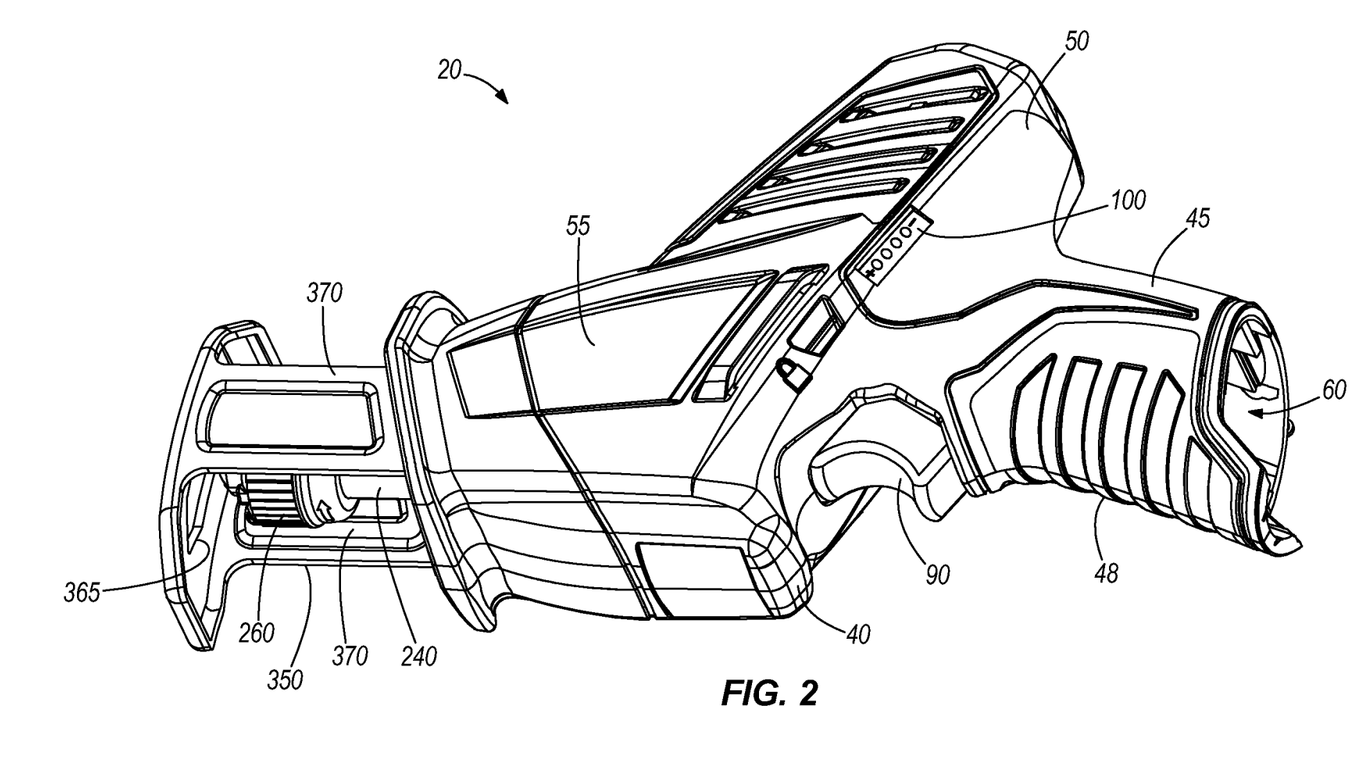

As shown in FIG. 1, the battery receiving portion 60 is configured as a cavity. When the battery pack 25 is connected to the saw 20, the pack 25 is inserted into the cavity 60 and substantially closes the cavity 60. A terminal block 70 (FIG. 6) is positioned in the cavity 60. The terminal block 70 includes a positive terminal 75, a negative terminal 80 and a sense terminal 85. The terminals 75, 80 electrically connect the battery pack 25 to the motor 65. The sense terminal 85 electrically connects the battery pack 25 to a monitoring circuit 105, which is discussed below.

As shown in FIGS. 2-4 and 7, a switch 90 is positioned on the handle housing portion 45 for powering the saw 20. As illustrated, the switch 90 is an on/off trigger switch. In other embodiments, the switch 90 may be a variable speed trigger switch, a two speed trigger switch, a push button or other actuator.

Figure 4:
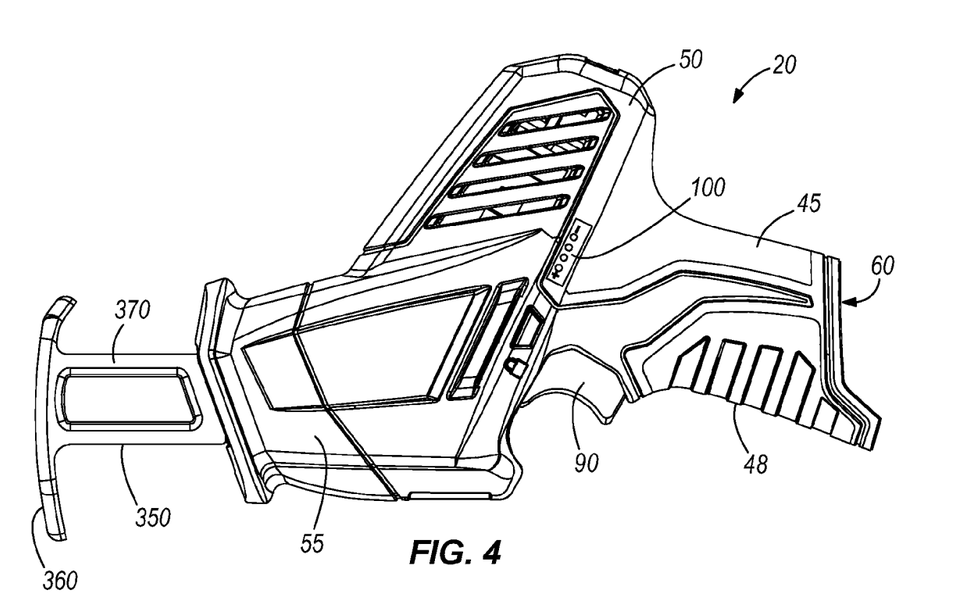
Figure 5:
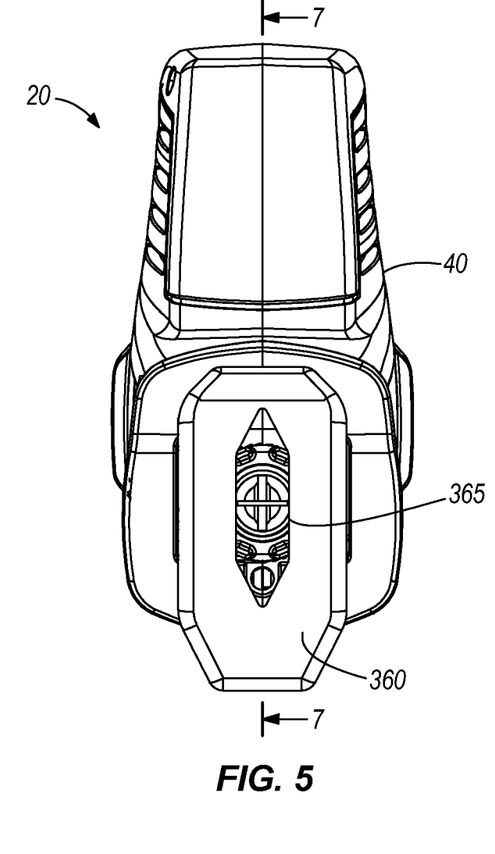
Figure 6:
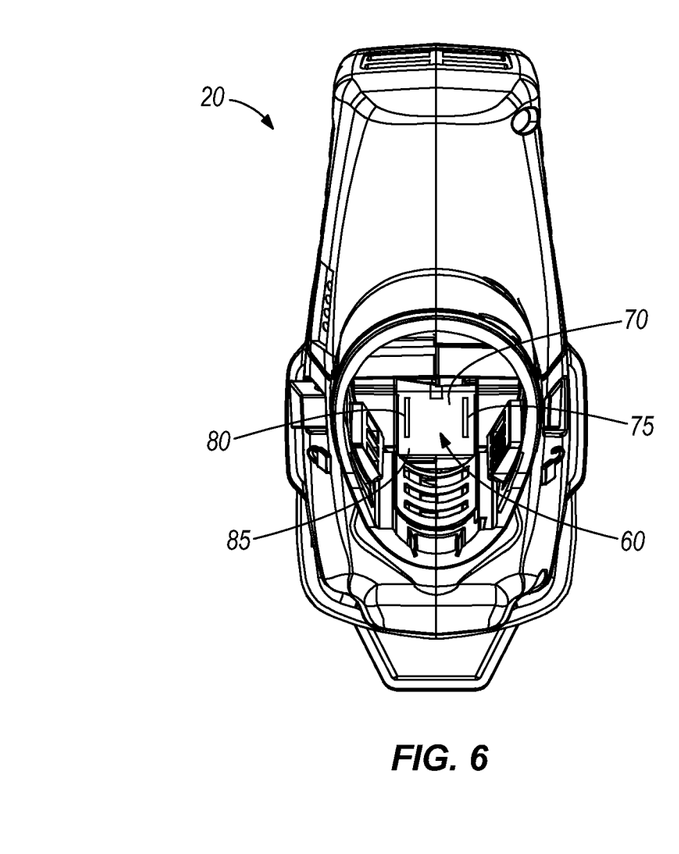

A fuel gauge 100 is positioned on the motor housing portion 50 just above the handle housing portion 45, as shown in FIG. 4. The fuel gauge 100 is activated and controlled by the monitoring circuit 105. The circuit 105 is positioned within the housing 40 and communicates with the battery pack 25. The monitoring circuit 105 periodically senses the state of charge of the battery pack 25 via the sense terminal 85 and displays the remaining state of charge to the user with a visual indication via the fuel gauge 100. For example, in the illustrated construction, the fuel gauge 100 includes four (4) LEDs. To display 100% state of charge remaining in the pack 25, the circuit 105 would activate all four (4) LEDs. To display 75% state of charge remaining, the circuit 105 would activate three (3) LEDs. For 50% state of charge remaining, two (2) LEDs would be activated, and for 25% state of charge remaining, one (1) LED would be activated. To display 10% state of charge remaining or a low state of charge warning, one (1) LED would be flashing.

In the construction shown, the fuel gauge 100 is activated when the user actuates the switch 90. In other constructions, the fuel gauge 100 may be activated when the user actuates a secondary switch (not shown), such as a push button.

Figure 9:
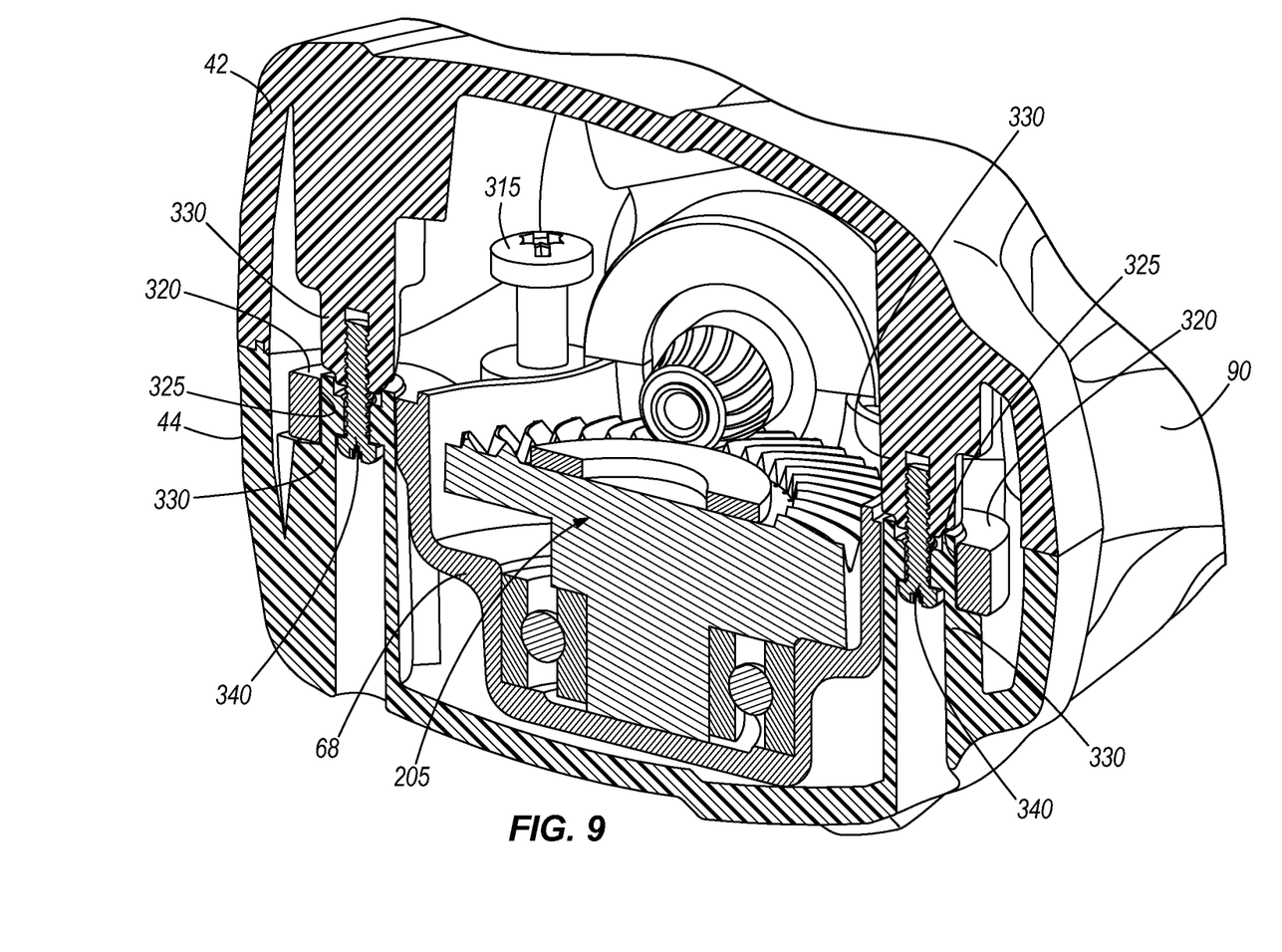

Referring to FIGS. 7-9, the gear case 68 encloses a drive system 205 for the saw 20. In this construction, the drive system 205 is a scotch yoke mechanism. The drive system 205 includes a driving gear 210, a driven gear 215, a pin 225 connected to the driven gear 215, and a yoke 230. In this construction, the driving gear 210 is a spiral bevel pinion and the driven gear 215 is a spiral bevel gear. The yoke 230 is connected to a spindle assembly 235. The spindle assembly 235 includes a spindle shaft 240 and a blade clamp 260. As shown in FIG. 1, a tool element 250, such as a blade, is coupled to the spindle shaft 240 via the blade clamp 260. In the construction shown, the blade clamp 260 includes the blade clamp assembly shown and described in U.S. Pat. No. 6,725,548, entitled "Keyless Blade Clamp Mechanism" and issued Apr. 27, 2004, the contents of which are hereby incorporated by reference. The blade clamp 260 can also be configured to accept a variety of reciprocating saw blades, jig saw blades and/or hack saw blades.

In operation, the pinion 210 is coupled directly to the output shaft of the motor 65. As the output shaft rotates, the pinion 210 rotates and engages teeth of the spiral bevel gear 215 to rotate the gear 215. As the spiral bevel gear 215 rotates, the pin 225 coupled to the gear 215 also rotates. The yoke 230 includes a shaft 245 that surrounds the pin 225 of the gear 215. Thereby, the yoke 230 translates back and forth due to the pin 225 rotating within the shaft 245. The yoke 230 in turn translates the spindle 240 in the desired reciprocating motion.

The gear case 68 also includes a first case portion 305 and a second case portion 310. In the construction shown, the gear case portions 305, 310 are metal cases. When assembled, gear case portions are secured via fasteners 315. In the construction shown, each portion 305, 310 includes one or more tabs or hoops 320. Each tab 320 includes an aperture 325 that extends through the tab 320, such that the apertures 325 align with and/or receive the bosses 330 formed in the housing portions 42, 44. In other constructions, the tabs or hoops 320 can be positioned on just one gear case portion, such as, for example, the first case portion 305, but not positioned on the other gear case portion, such as, for example, the second case portion 310. In further constructions, the tabs 320 can be formed on each gear case portion 305, 310. However, the tabs 320 positioned on the first case portion 305 may not align with the tabs 320 positioned on the second case portion 310. In this construction, the tabs 320 positioned on the first case portion 305 will only align with some of the bosses 330, while the tabs 320 positioned on the second case portion 310 will only align with the remaining bosses 330. In still further constructions, the tabs 320 can be configured in a different shape or manner.

As shown in FIG. 9, when the saw 20 is assembled, each of the bosses 330 formed in the housing portions 42, 44 align with one of the apertures 325 of the respective tab 320 formed in the gear case 68. Further, each of the bosses 330 formed in the first housing portion 42 substantially align in the tabs 320 with the bosses 330 formed in the second housing portion 44. The bosses 330 at least partially extend through the tabs 320, such that the tab 320 surrounds a portion of at least one of the bosses 330. In some constructions, the bosses 330 from each housing portion 42, 44 contact each other within the tab 320. However, in other constructions, the bosses 330 from each housing portion 42, 44 may be adjacent, although not in physical contact, with each other. In other constructions, the bosses 330 may be of different height, such that to engage with each other, bosses 330 on one of the housing portions 42, 44 extend further than the bosses 330 on the other of the housing portions 42, 44.

Fasteners 340 are inserted into the bosses 330 to couple the first housing portion 42 to the second housing portion 44 and further secure the gear case 68 within the housing 40. Since the fasteners 340 reside within the bosses 330, the fasteners 340 are electrically isolated from the gear case 68, including the drive system 205 and spindle shaft 240 that are contained in the gear case 68, and thereby the gear case 68 is electrically isolated within the housing 40 and from the rest of saw 20.

Figure 3:
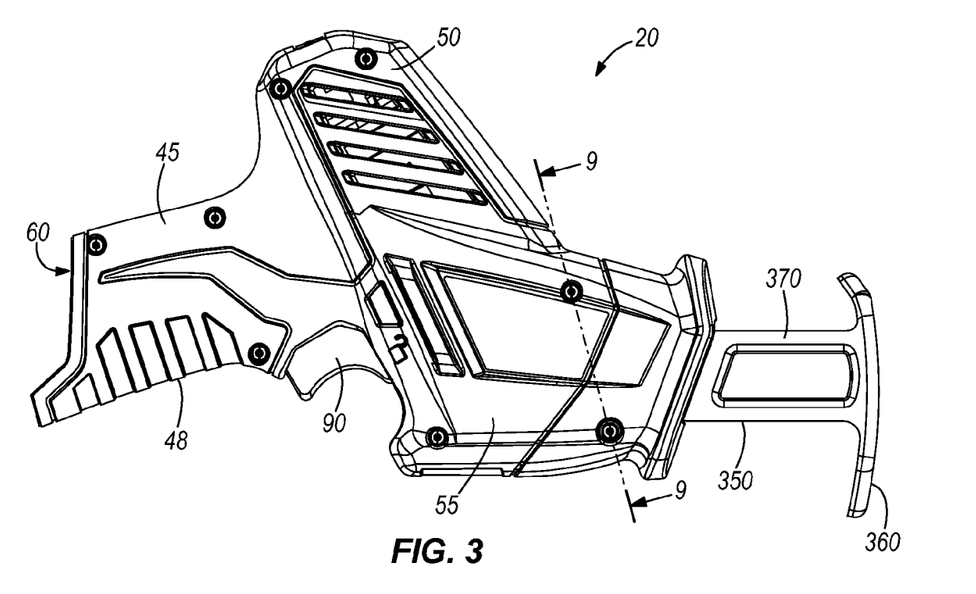

The saw 20 also includes a shoe assembly 350. In the construction shown, the shoe assembly 350 is a fixed shoe assembly. The shoe assembly 350 includes a front surface or plate 360 which engages or rests on a workpiece. As shown in FIGS. 3, 4 and 7, the front surface 360 is slightly curved outward from the saw 20, or non-planar. The front surface 360 is curved such that any three points on the front surface 360 lying in a plane parallel to a center plane (coplanar with axis 420) of saw 20 defines an arc or radius of curvature of approximately 170 mm. In other constructions (not shown), the plate 360 may have a radius greater than or less than 170 mm. The front plate 360 also defines an opening 365 for the saw blade 250 to pass through. The shoe assembly 350 further includes a top portion 395 coupled to the top of the front surface 360 and lying outside of the 170 mm arc. The shoe assembly 350 also includes two connecting members 370 for connecting the shoe assembly 350 to the housing 40. In other constructions (not shown), the shoe assembly 350 may be an adjustable shoe assembly or a pivoting shoe assembly.

As shown in FIG. 7, the battery pack 25 is inserted into the battery cavity 60 of the saw 20 along a handle axis 400, which also defines a battery insertion axis. The motor 65 is positioned within the housing 40 and defines a longitudinal motor axis 410 along a length of the motor 65. The gear case is also positioned along the motor axis 410. The spindle 240 and the saw blade 250 are positioned along a longitudinal spindle axis 420 defined along a length of the spindle 240 and saw blade 250. The reciprocating motion of the spindle 240 translates back and forth along the spindle axis 420.

The axes 400, 410, 420 are positioned such that each axis 400, 410, 420 is oblique, or not otherwise perpendicular and/or parallel with respect to the other axes. More specifically, the handle axis 400 is positioned at an angle $\alpha$ with respect to the motor axis 410, the motor axis 410 is positioned at an angle $\theta$ with respect to the spindle axis 420, and the spindle axis 420 is positioned at an angle $\beta$ with respect to the handle axis 400. In some embodiments, each of the axes 400, 410, 420 may be either non-parallel or non-orthogonal with respect to each of the other axes 400, 410, 420.

In the illustrated construction and referring to FIG. 7, each of the axes 400, 410, 420 is oblique with respect to the other axes 400, 410, 420. Angle $\alpha$ is an angle defined between the handle axis 400 and the motor axis 410 and is in a range of approximately 50 degrees to 70 degrees. In the illustrated construction, angle $\theta$ is 60 degrees. In still other constructions, angle $\alpha$ may be greater than 70 degrees or less than 50 degrees. Angle $\theta$ is an angle defined between the motor axis 410 and the spindle axis 420 and is in a range of approximately 110 degrees to 130 degrees. In the illustrated construction, angle $\theta$ is approximately 120 degrees. In other constructions, angle $\theta$ may be greater than 130 degrees or less than 110 degrees. Angle $\beta$ is an angle defined between the handle axis 400 and the spindle axis 420 and is in a range of approximately 150 degrees to 170 degrees. In the illustrated construction, angle $\beta$ is approximately 161.7 degrees. In other constructions, angle $\beta$ is greater than 170 degrees or less than 150 degrees.

The position of the axes, the size of the tool, and other characteristics are designed for optimal cutting application for the saw 20, including but not limited to PVC cutting, dry wall cutting, light metal cutting, EMT or thin wall conduit cutting and the like. For example, the orientation of motor 65 along motor axis 410 allows the saw 20 to be more compact by reducing the overall length of saw 20 as compared to the length of a conventional saw. Saw 20 is also ergonomically designed such that the longitudinal axis 400 is positioned for optimal user operation related to handle grip location and angle for performing a cutting operation.

Although the invention has been described in detail with reference to certain preferred embodiments, variations and modifications exist within the scope and spirit of one or more independent aspects of the invention as described.

What is claimed is:

1. A reciprocating saw comprising:
   a housing including a handle housing portion, a motor housing portion, and a gear case housing portion, the handle housing portion having a longitudinal axis that defines a first axis of the reciprocating saw;
   a motor supported by the motor housing portion, the motor including an output shaft having a longitudinal axis that defines a second axis of the reciprocating saw;
   a switch positioned on the handle housing portion, the switch configured to power the reciprocating saw;
   a pinion gear coupled to the output shaft of the motor for rotation with the output shaft;
   a driven gear engaged with the pinion gear such that the driven gear rotates in response to rotation of the pinion gear;
   a spindle coupled to the driven gear such that rotation of the driven gear by the pinion gear reciprocates the spindle along a longitudinal axis of the spindle that defines a third axis of the reciprocating saw;
   a blade clamp coupled to the spindle such that the blade clamp reciprocates with the spindle, the blade clamp configured to couple a saw blade to the spindle;

wherein the first axis, the second axis, and the third axis are oblique with respect to each of the other axes, wherein the second axis and the third axis define a first angle, and wherein the first angle is in a range of approximately 110 degrees to 130 degrees.

2. The reciprocating saw of claim 1, wherein the first angle is approximately 120 degrees.

3. The reciprocating saw of claim 1, wherein the first axis and the third axis define a second angle, and wherein the second angle is in a range of approximately 150 degrees to 170 degrees.

4. The reciprocating saw of claim 3, wherein the second angle is approximately 161.7 degrees.

5. The reciprocating saw of claim 1, wherein the first axis and the second axis define a third angle, and wherein the third angle is in a range of approximately 50 degrees to 70 degrees.

6. The reciprocating saw of claim 5, wherein the third angle is approximately 60 degrees.

7. The reciprocating saw of claim 1, further comprising a battery operable to power the motor, wherein the handle housing portion includes a cavity, and wherein the battery is received in the cavity along the first axis.

8. The reciprocating saw of claim 1, wherein the driven gear rotates about an axis of rotation, the reciprocating saw further comprising a pin coupled to the driven gear for rotation with the driven gear about the axis of rotation, and a yoke coupled to the spindle and the yoke reciprocates with the spindle along the third axis, wherein the pin extends into the yoke such that rotation of the driven gear rotates the pin to reciprocate the yoke and the spindle along the third axis.

9. The reciprocating saw of claim 1, wherein the driven gear rotates about an axis of rotation, wherein the longitudinal axis of the motor intersects the longitudinal axis of the spindle at the axis of rotation of the driven gear.

10. The reciprocating saw of claim 1, wherein the driven gear is a bevel gear and the pinion gear is a bevel gear.

11. The reciprocating saw of claim 1, further comprising, a gear case supported by the gear case housing portion, the gear case substantially enclosing the pinion gear and the driven gear, wherein the gear case is coupled to the housing and is electrically isolated from the housing.

12. The reciprocating saw of claim 11, wherein the gear case housing portion includes a boss, wherein the gear case includes a tab having an aperture for receiving the boss, the reciprocating saw further comprising a fastener that extends through the boss to couple the gear case to the housing, wherein the boss electrically isolates the gear case from the housing.

13. The reciprocating saw of claim 11, wherein the housing is formed from a first housing portion and a second housing portion, each housing portion including a boss, wherein the boss of the first housing portion aligns with the boss of the second housing portion, wherein the gear case includes a tab with an aperture, wherein the aperture of the tab receives at least one of the bosses, the reciprocating saw further comprising a fastener that extends through the bosses to couple the gear case to the housing, wherein the bosses electrically isolate the gear case from the fastener.

14. The reciprocating saw of claim 13, wherein each boss at least partially extends into the aperture of the tab.

15. The reciprocating saw of claim 13, wherein the boss of the first housing portion contacts the boss of the second housing portion.

16. The reciprocating saw of claim 1, wherein the motor is positioned above the longitudinal axis of the spindle.

17. The reciprocating saw of claim 1, wherein the pinion gear is positioned above the longitudinal axis of the spindle.

18. The reciprocating saw of claim 1, further comprising a shoe for engaging a surface of a workpiece, wherein the shoe includes a non-planar front surface configured to engage the surface of the workpiece.

19. The reciprocating saw of claim 18, wherein the non-planar front surface has a radius of curvature of approximately 170 mm measured with respect to a center plane of the spindle.

* * * * *